United States Patent [19]

Johnson

[11] Patent Number: 5,069,026
[45] Date of Patent: Dec. 3, 1991

[54] PUSH-PULL RAKE

[76] Inventor: Richard J. Johnson, 1425 Algoma St., New London, Wis. 54961

[21] Appl. No.: 594,549

[22] Filed: Oct. 9, 1990

[51] Int. Cl.⁵ .............................................. A01D 7/02
[52] U.S. Cl. .............................. 56/400.11; 56/400.17
[58] Field of Search ........... 56/400.01, 400.04, 400.05, 56/400.07, 400.11, 400.13, 400.16, 400.17, 400.19

[56] References Cited

U.S. PATENT DOCUMENTS

| | | | |
|---|---|---|---|
| 566,048 | 8/1896 | Woeber | 56/400.17 |
| 1,318,577 | 10/1919 | Moquist | 56/400.17 |
| 1,866,754 | 7/1932 | Crane | 56/400.17 |
| 2,205,827 | 6/1940 | Brooke | 56/400.17 |
| 2,545,226 | 3/1951 | Claude | 56/400.11 |
| 2,746,235 | 5/1956 | Kautenberg | 56/400.17 |
| 2,790,296 | 4/1957 | Bernstein | 56/400.04 |
| 4,189,908 | 2/1980 | Brock, Jr. | 56/400.01 |
| 4,219,993 | 9/1980 | Cosmos | 56/400.17 |
| 4,520,621 | 6/1985 | Archer | 56/400.01 |

Primary Examiner—Thuy M. Bui
Attorney, Agent, or Firm—Thomas D. Wilhelm

[57] ABSTRACT

Lawn rakes and rake attachments, and methods of use are disclosed. An open top, open front receptacle is disposed on the raking platform for use with a push raking operation wherein the rake teeth are turned upwardly. The rake generally slides under lawn debris such as leaves, so the debris rides over the upstanding teeth and onto the main portions of the teeth, onto the rake body platform and against the rear wall of the receptacle. With continued pushing, a deeper pile of debris collects on the rake and accumulates ahead of the rake. The push raking operation requires less energy and less dexterity, to move a given amount of leaves, than a conventional pull raking operation. Accordingly, some elderly, injured, and handicapped persons who cannot do pull-raking work, can now clean up their lawns using the apparatus and methods of the subject invention.

16 Claims, 9 Drawing Sheets

PUSH-PULL RAKE

BACKGROUND OF THE INVENTION

This invention relates to hand rakes, and particularly to an improved rake of the type known in the art as a lawn rake.

The popular fan-shaped lawn rake as taught in, for example U.S. Pat. 4,219,993, herein incorporated by reference, is routinely used for raking leaves and other lawn debris. Such rakes are intended and designed for performing pull raking functions.

The use of a pull rake, in a pull raking operation, requires an amount of exertion such that some persons, especially some elderly, injured and handicapped persons, are not able to effectively use a pull rake to clean up ordinary debris in their yard.

In the more typical case wherein pull raking is a choice, namely the rake user does have sufficient dexterity and strength, the pull raking operation takes considerable time and does consume a significant amount of energy, for example to gather the leaves which have fallen in Autumn.

It is an object of this invention to provide a lawn rake which requires less energy and less dexterity to operate than a conventional lawn rake.

It is a further object to provide a lawn rake which can be used primarily in a push raking mode to gather the bulk of typical yard debris, and which is adapted to also be used in the conventional pull raking mode.

It is a more specific object to provide a push-pull rake having the normal up-turned rake teeth, and having a receptacle thereon, on the same side of the rake as the teeth, for receiving leaves and for providing a pushing surface to, in cooperation with the accumulating lawn debris, push and pile lawn debris ahead of the rake.

It is a further object to provide such a rake wherein the height of the receptacle walls is such that the rake can be used in the conventional pull raking mode, with the teeth directed downwardly, while maintaining clearance between the receptacle walls and the ground.

It is another object to provide a rake attachment apparatus adapted to be attached to a conventional lawn rake, thereby to provide, on the rake, a receptacle for receiving and generally immobilizing leaves and for providing a pushing surface to push and pile lawn debris on and ahead of the rake.

Another object is to provide, on the rake body, curved bearing segments of the teeth at the locus where the main portions of the teeth meet the upstanding end portions of the teeth, the radii of the arcs of the outer surfaces of the bearing segments being sufficiently large to accommodate sliding upon forward pushing of the rake body along the ground when the rear of the rake body is inclined upwardly as at a normal pushing height of an adult, e.g. between the hips and chest, and generally defining a height of about 36 to about 54 inches.

It is a more specific object to provide such an attachment apparatus wherein, when attached to the body of the rake, the upstanding walls of the so provided receptacle are such that the rake can be used in the conventional pull raking mode, with the teeth directed downwardly, while maintaining clearance between the receptacle walls and the ground.

Still other objects relate to providing methods of raking wherein the rake is pushed in cleaning up lawn debris, with optional pull-raking as further clean up.

SUMMARY OF THE DISCLOSURE

Some of the objects are obtained in a first family of embodiments comprising a rake body. The rake body comprises a rake body platform having a top surface, a bottom surface, a front, a rear, and opposing sides between the front and the rear, an upstanding rear wall secured to the rake body platform and extending upwardly from the top surface of the rake body platform, upstanding sides walls secured to the rake body platform, and extending upwardly from the rake body platform and forwardly of the rear wall toward the front of the rake body platform, and a plurality of upstanding teeth spaced along the front of the rake body platform and extending upwardly from the platform. The teeth typically define an angle of at least about 30 degrees as measured between the teeth and an imaginary extension of the rake body platform forwardly of the front of the platform. The upstanding rear and side walls collectively comprise a receptacle having an open top and an open front. The rake body is effective to collect and push leaves or other lawn debris on a substantially flat ground surface whereby, as the rake body is pushed along the ground surface with the rake body platform disposed at an angle of about 25 degrees to about 45 degrees with the ground, and with the front of the platform generally comprising the apex of the angle, the teeth extend upwardly from the ground, leaves or other lawn debris ride up and over the upstanding teeth, and a first mass of the debris collects in the receptacle; and, as the rake body is pushed farther, a second mass of the debris collects on, and in front of, the rake body while the first mass of debris remains immobilized in the receptacle.

In preferred embodiments of the invention, the upstanding teeth are joined with the rake body platform by corresponding curved bearing segments. The curved bearing segments are positioned for disposition in contact with the ground during pushing use of the rake body, and the outer surfaces of the curved bearing segments comprise a radius of curvature sufficiently large to accommodate pushing the rake body along the ground and in contact with the ground at bearing segments when the rear of the rake body platform is held at a height corresponding to the height of the rear when a conventional handle attached thereto is held at normal pushing height of an adult.

Preferably, the height and length of the sidewalls are such that the rake body platform can be turned over with the teeth pointing downwardly and can be used in conventional pull raking while maintaining clearance between the side walls and the ground.

The invention contemplates a second family of embodiments comprising a rake attachment apparatus adapted to be attached to a lawn rake. The rake attachment apparatus comprises an attachment platform generally defined in a sheet-like surface and comprising a top surface, a bottom surface, a front, a rear, and opposing sides between the front and the rear; an upstanding rear wall secured to the rear of the attachment platform, and extending upwardly from the platform; upstanding side walls secured to, and extending upwardly from, the attachment platform, and forwardly of the rear wall toward the front of the attachment platform; a pair of stabilizing fingers extending forwardly of the front of the attachment platform along the side edges; and means for securing the rake attachment apparatus to a lawn rake.

In these embodiments, the height and length of the side walls are such that, when the attachment apparatus is secured to a lawn rake which comprises a rake body having a plurality of upstanding teeth spaced along a front thereof, and a rake handle extending from the rake body, the rear wall of the attachment being adjacent the joinder of the rake body and the handle, the rake can be turned over with the teeth pointing downwardly and can be used in conventional pull raking while maintaining clearance between the side walls and the ground.

In the preferred attachment of the attachment apparatus to such a lawn rake, the top surface of the attachment apparatus platform is disposed adjacent the bottom surface of the rake body platform, with the rear wall of the attachment apparatus generally disposed adjacent the rear of the rake body platform. Thus, the rake body platform and the attachment apparatus platform comprise, in combination, a composite platform, with the stabilizing fingers of the attachment apparatus being disposed along, and secured to, the sides of the rake body platform, whereby the front of the attachment apparatus is stabilized with respect to the rake body.

Another way of describing the rake body for a push-pull rake is as comprising a main body portion comprising a bottom wall, an upstanding rear wall, and a pair of opposing side walls, the main body portion generally defining a receptacle open on a front end thereof disposed toward the front of the rake body, and open on the top thereof; and a rake portion, the rake portion comprising a plurality of rake teeth, the teeth comprising elongated extension segments, upturned end segments, and curved bearing segments between the extension segments and the upturned end segments, the teeth being generally arranged in side-by-side relationship and extending from the main body portion frontwardly toward the front of the rake body, and terminating at the upturned end segments, the combination of the teeth generally defining an optionally discontinuous surface extending toward the bottom wall of the main body portion, bearing segments comprising arcs in the teeth. The radii of the arcs, at outer surfaces of the bearing segments are sufficiently large to accommodate sliding of the bearing segments with respect to the ground upon pushing of the rake body along the ground and in contact therewith at the outer surfaces when the rear of the rake body is held at a height corresponding to the height of the rear when a conventional handle attached to the rake body is held at normal pushing height of an adult. The rake body is adapted to operate as a pushing tool, sliding along the ground, with the end segments facing upwardly, by sliding interface between the outer surfaces of the bearing segments and the ground, whereby leaves and other debris pass over the upturned end segments, onto the elongated extension segments of the teeth and the bottom wall of the main body portion and are pushed by the rake body upon impacting the rear wall. The rake body is also adapted to operate as a pull raking tool when the rake body is rotated 180 degrees about a central axis extending from the front to the rear, wherein the end segments of the teeth are disposed downwardly in pulling position.

The rake body further comprehends a method of raking lawn debris. The method comprises the steps of selecting a rake comprising the rake body container or attachment as disclosed herein, placing the curved bearing segments on the ground with the teeth extending upwardly in front of lawn debris, positioning the distal end of the handle at a height whereby the rake body platform defines an angle of about 25 to about 45 degrees with the ground, and pushing the rake toward and into the debris, whereby the debris rides up and over the upstanding teeth, as necessary, and into the receptacle. The method further comprises the option to turn the rake over with the teeth pointing downwardly and using the rake in conventional pull raking without incurring interference between the side walls of the receptacle and the ground. Accordingly, the same rake tool can be, and is, used in both push raking operations and pull raking operations.

DETAILED DESCRIPTION OF THE ILLUSTRATED EMBODIMENTS

Figure 1:
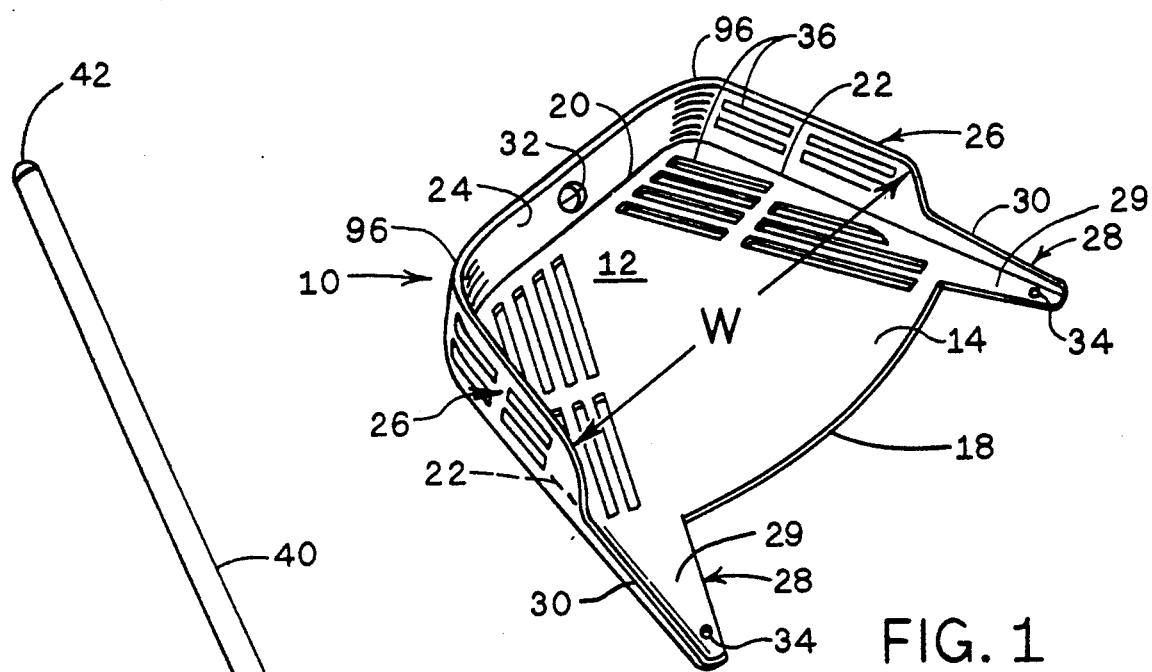
FIG. 1 is a pictorial illustration of a rake attachment of this invention.

Referring now to FIG. 1, rake attachment 10 comprises an attachment platform 12 comprising a top surface 14, a bottom surface 16, a front 18, a rear 20, and opposing sides 22 between the front and the rear. Upstanding rear wall 24 is secured to platform 12 at its rear edge. Upstanding sides walls 26 are secured to platform 12 at its side edges and extend forwardly from their joinder with rear wall 24, as extensions therefrom, toward the front of the attachment 10 which corresponds generally with the front 18 of platform 12. A pair of stabilizing fingers 28 extend forwardly from the front 18 of platform 12, with elements 29 of the stabilizing fingers being disposed generally parallel to imaginary extensions of platform 12, along the entire lengths of the stabilizing fingers, generally wrap upwardly to include reduced-height portions 30 of side walls 26. Hole 32 is sized to receive the handle of a conventional lawn rake with a relatively snug, but slidable fit. Holes 34 are used to secure the rake attachment to a lawn rake at stabilizing fingers 28 using securing straps as seen hereafter. A plurality of vent holes 36 are provided in e.g. platform 12 and side walls 26 as shown to relieve the pressure of wind blowing against the attachment when it is in use, and to control the weight of the tool, and the amount of material used.

Figure 2:
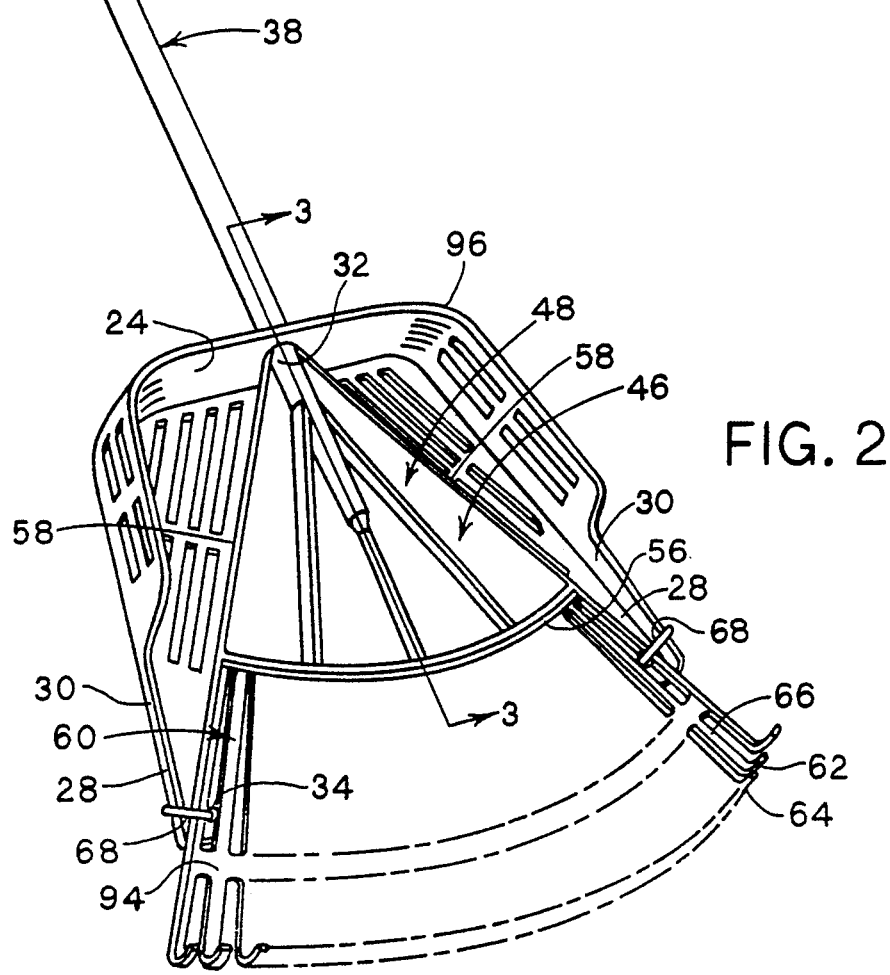
FIG. 2 is a pictorial illustration of a lawn rake with the attachment of FIG. 1 attached for use therewith.

Turning now to FIG. 2, the rake attachment 10 is secured to a lawn rake 38. Rake 38 comprises a conventional handle 40 having a first distal end 42, and a second end 44 to which is attached a rake body 46. The rake body 46 comprises a rake body platform 48 generally defined in a sheet-like surface, and has a top surface 52, a bottom surface 54, a front 56, and opposing side edges 58. A plurality of teeth 60 extend forwardly of the front 56 of the rake body platform 48, and terminate at upstanding end portions 62 of the teeth 60. Curved bearing segments 64 of teeth 60 are disposed between, and join, the end portions 62 of the teeth and the main portions 66 of the teeth which extend between platform 48 and bearing segments 64.

Handle 40 is inserted through hole 32 in rear wall 24 with a snug fit, whereby hole 32 serves to secure the rake attachment apparatus to the rake at rear wall 24. A pair of securing straps 68 extend through holes 34, to the inside of the edge ones of teeth 60, around the tops of the edge teeth 60 and around the tops and outsides of reduced-height portions 30 on fingers 28 and thence are tightened, whereby the side edges of rake 38 are secured to fingers 28 of the attachment. Accordingly, attachment 28 is securely affixed to the rake at three locations, namely at hole 32, and at both holes 34.

Figure 3:
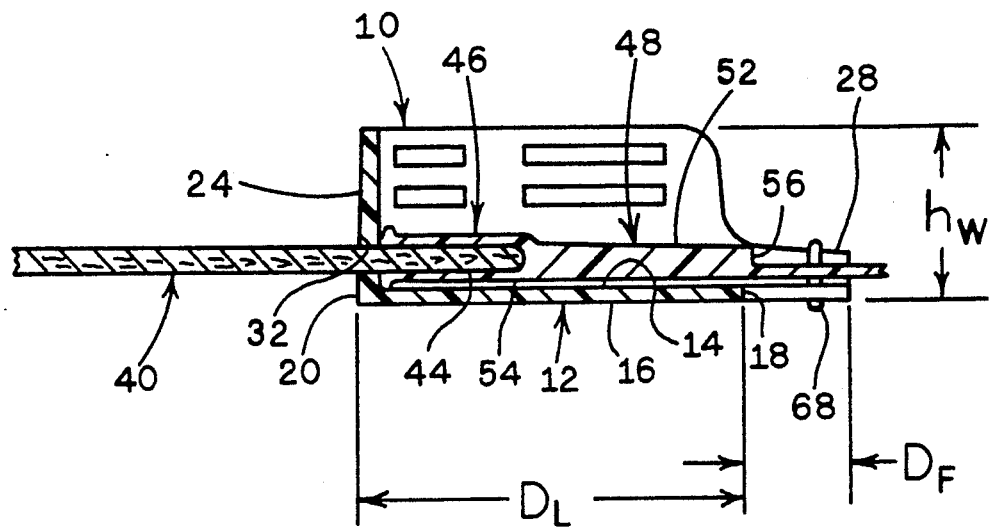
FIG. 3 is a cross-section of the rake and attachment of FIG. 2 taken at 3—3 of FIG. 2.

FIG. 3 shows, in cross-section, the top surface 14 of the attachment platform 12 adjacent the bottom surface 54 of the rake body platform 48, and shows the preferred snug fit between rake handle 40 and hole 32 in the rear wall 24 of the attachment 10.

Figure 4:
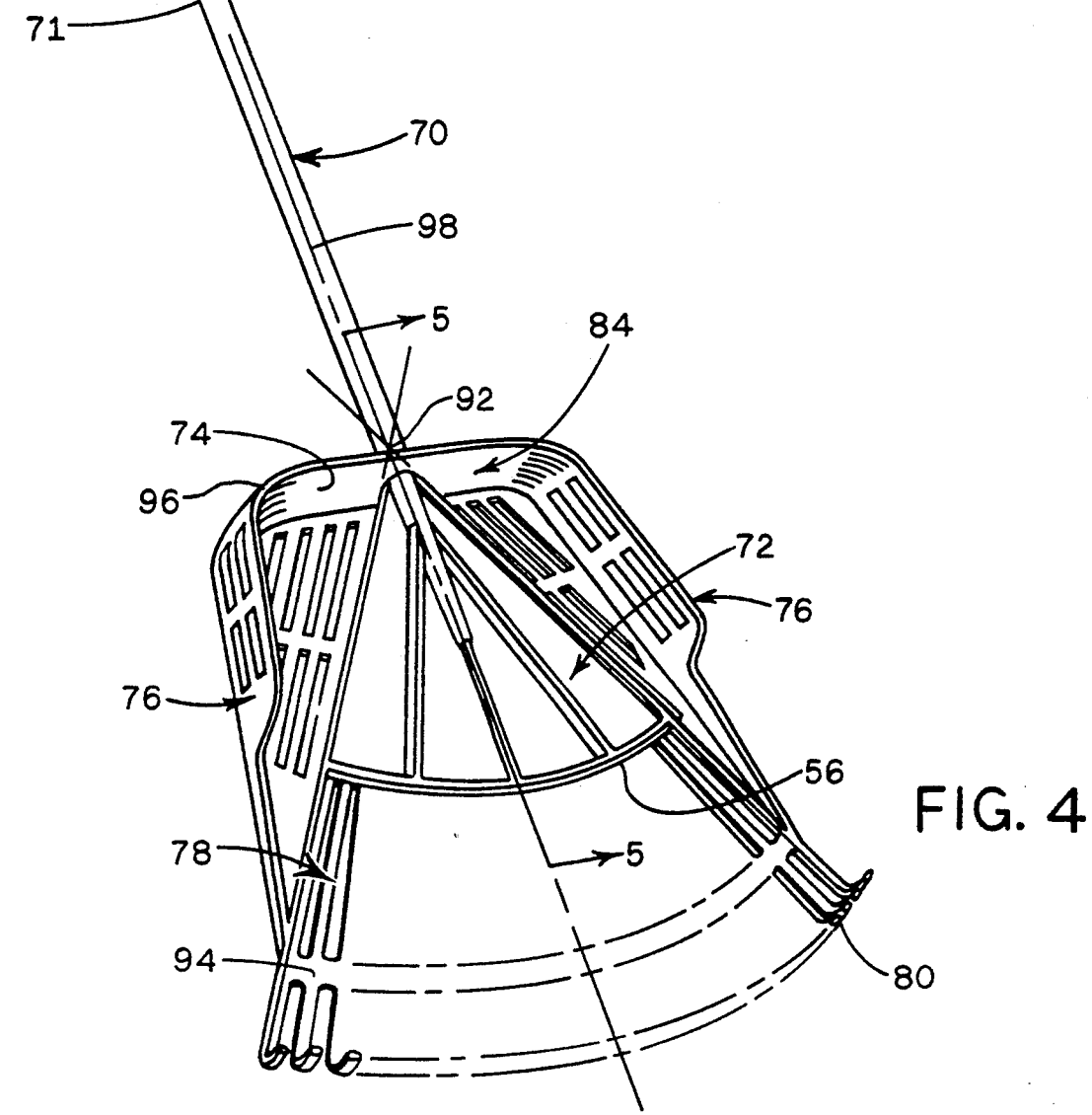
FIG. 4 is a pictorial illustration of a lawn rake of this invention incorporating therein a receptacle adapted to collect and push lawn debris.

FIG. 4 shows a rake 70 which integrally incorporates, into the rake body, which is attached to a conventional handle 71, the functional elements of rake attachment 10. Accordingly, the rake platform 72 corresponds generally to the composite of rake body platform 48 and attachment platform 12, as well as stabilizing fingers 28 of FIGS. 1 and 2. Rear wall 74 corresponds generally to rear wall 24 of attachment 10. Side walls 76 correspond generally to side walls 26 of attachment 10. Rake teeth 78 correspond to teeth 60 of FIG. 2. Bearing segments 80 correspond to bearing segments 64 in FIG. 2.

Figure 5:
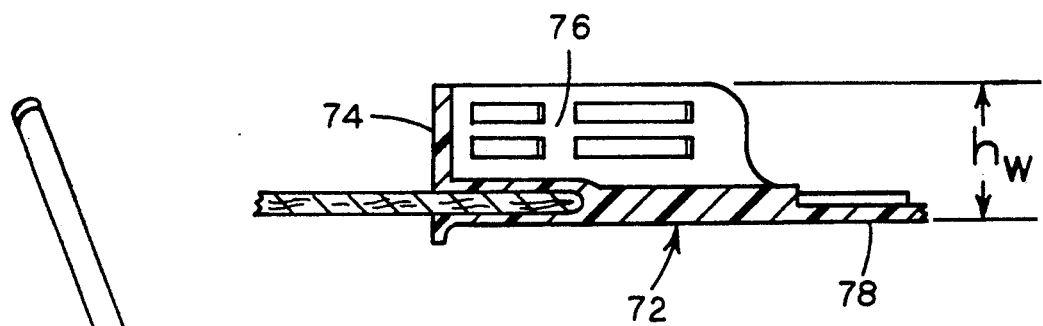
FIG. 5 is a cross-section of the rake of FIG. 4 taken at 5—5 of FIG. 4.

Accordingly, the embodiment of FIG. 4 illustrates the combination of the attachment 10 of FIG. 1 and the rake body 46 (FIG. 2) into one integral unit, which is also illustrated in cross-section at FIG. 5. By comparing the cross-sections of FIGS. 3 and 5, there is clearly seen the relationship between the assembled two-piece construction (FIG. 3) and the one-piece construction (FIG. 5).

Figure 8:
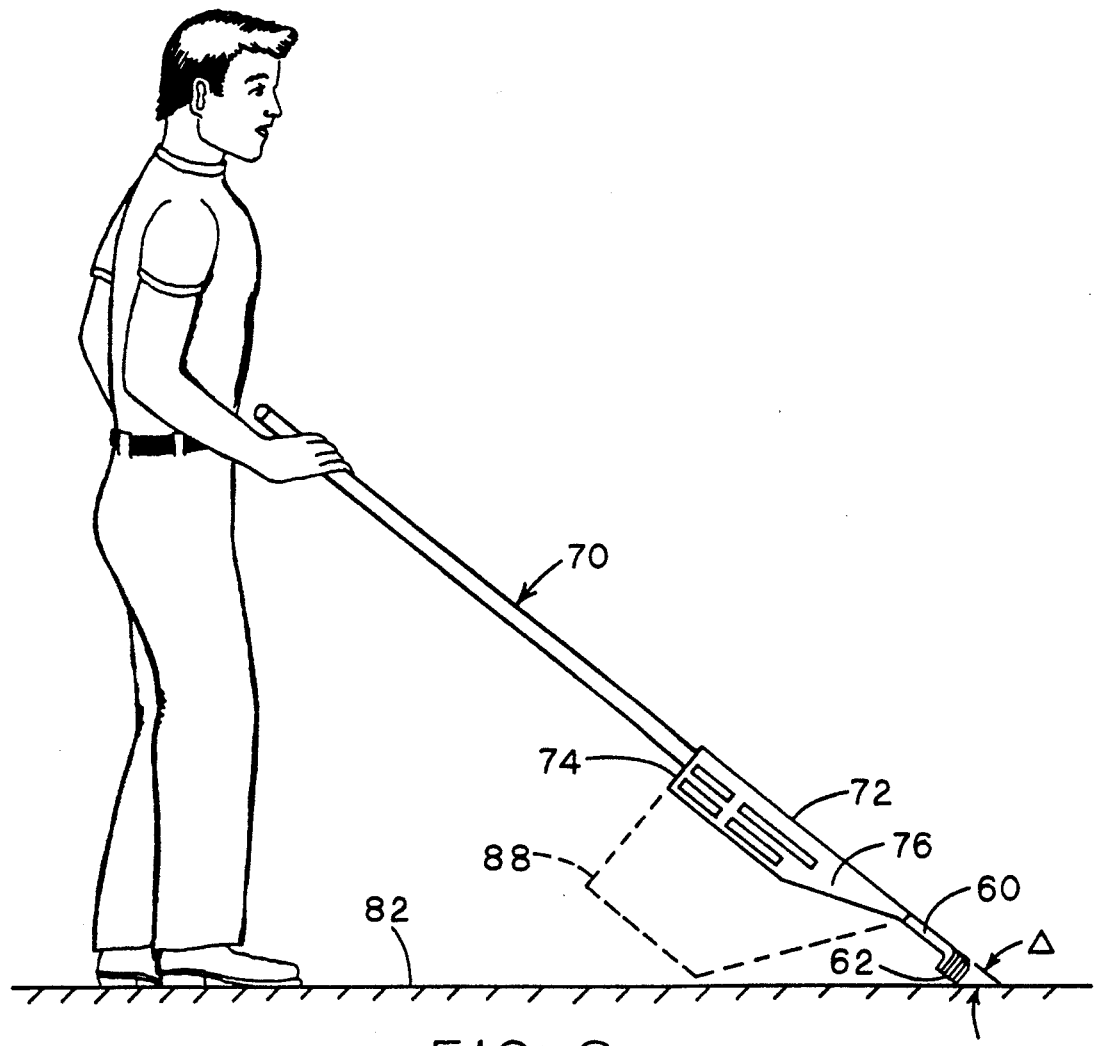
FIG. 8 shows a side view of a rake of this invention being used in a pull raking operation.
Figure 6:
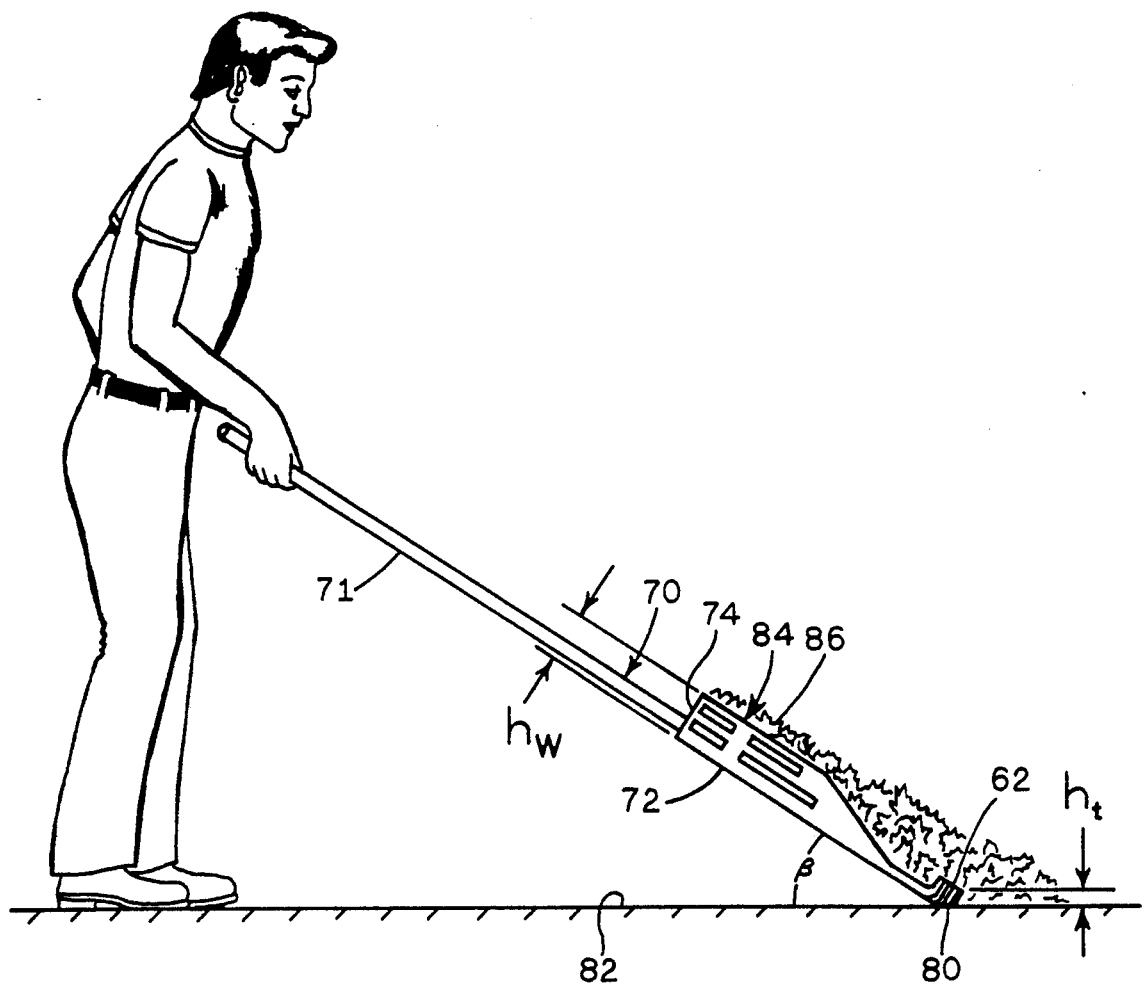
FIG. 6 shows a side view of a rake of this invention being used as a push rake to collect and push leaves.
Figure 9:
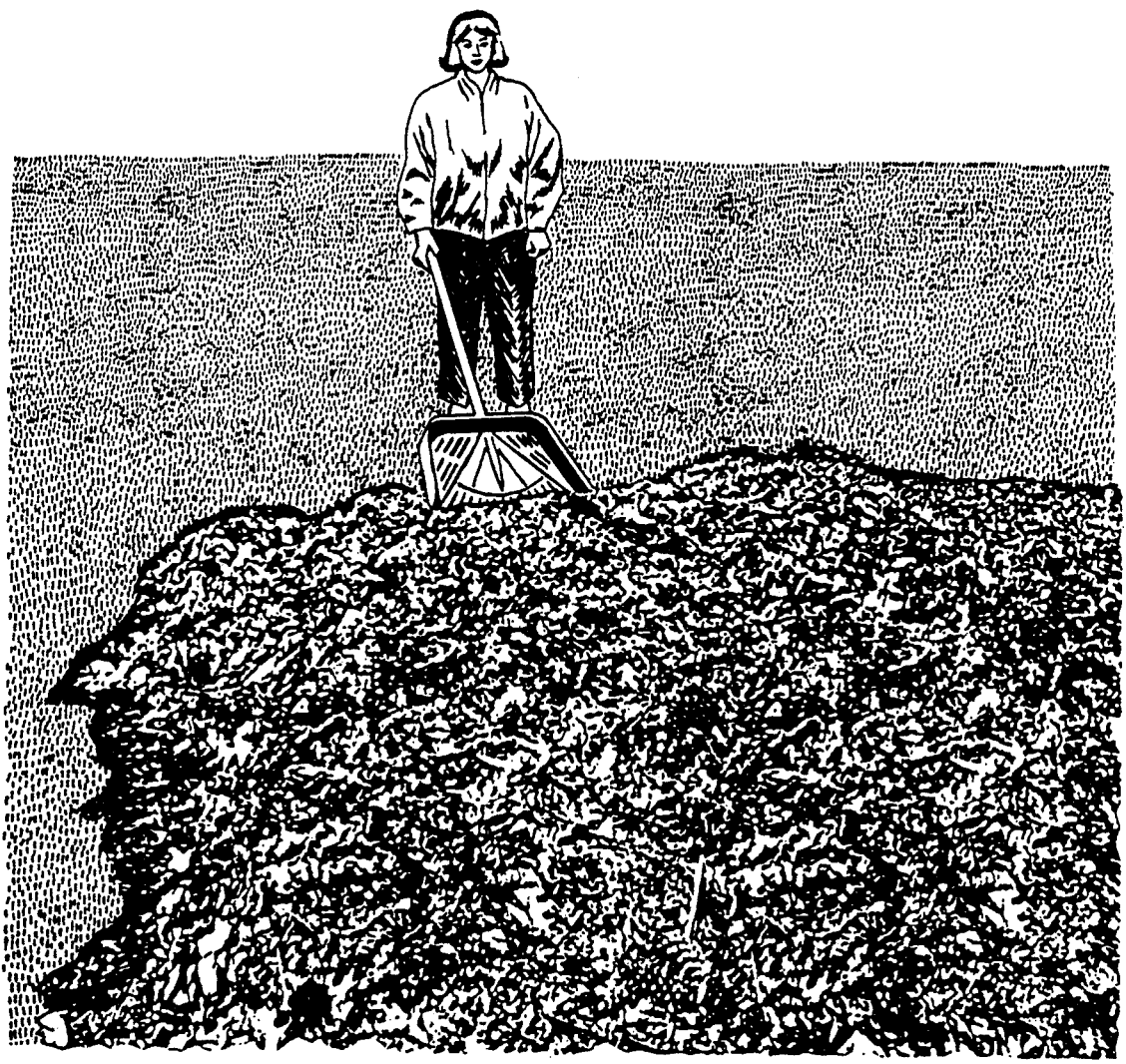
FIGS. 9–13 illustrate the progressive operation of push raking leaves using apparatus of the invention.
Figure 10:

FIG. 6 illustrates the use of the rake of FIGS. 4 and 5 in push-raking of leaves. FIGS. 9-12 illustrate the progression of this operation. The rake 70 is placed with the bearing segments 80 on the ground 82 as shown, and in an area which is generally free from leaves, and adjacent the leaves to be moved. If there is no such area free from leaves in the desired location, the rake can be turned over, with the teeth ends pointing downwardly as illustrated in FIG. 8; and the rake can be used in a conventional pull-raking operation to clear an (e.g. small) area. Then the rake is turned with teeth ends up as shown in FIG. 6, with the curved bearing surfaces of the teeth on the ground as illustrated. FIG. 9 shows another illustration of the step of properly placing the rake on the ground adjacent the leaves, using the assembly as in FIG. 2.

With the bearing surfaces bearing on the ground, and the end portions 62 of the teeth turned upwardly, the rake is pushed into the layer of accumulated leaves, such as the layer which typically accumulates on top of the surface defined by the tops of the lawn grasses and under and around deciduous trees in the Fall.

As the rake is pushed into the layer of leaves, with the end portions 62 of the teeth extending above the top of the grass surface, the leaves first are pushed by end portions 62 and form a low ridge in front of teeth ends 62. This low ridge will be e.g. no more than typically about 4 inches high and about 6-8 inches long. The rake then essentially slides under the leaves, so that the leaves at the ridge ride up and over the upstanding teeth, onto the main portions 66 of the teeth, onto the rake body platform, and ultimately encounter rear wall 74 (FIG. 4). This progression is seen in FIGS. 6 and 9-11.

Figure 12:
Figure 13:

As the rake is pushed further, rear wall 74 begins pushing on the leaves nearest it, whereby they are inherently immobilized pushing them forwardly with the progression of the rake, inter alia rear wall 74. The leaves pass on, and thereby transfer, the pushing force forwardly, as an inherent extension of the leaves immobilized at the rear wall, and begin to compact lightly, rear to front, and to build up on the rake. Finally, the pushing force is transferred forwardly by the leaves on the rake to leaves still on the ground in front of the rake, as a further extension of the mass of leaves immobilized on the rake, whereby a general compaction and accumulation of leaves occurs ahead of the rake, and moves progressively ahead of the rake and continues to accumulate as the rake is moved forward. This final stage of the push raking operation is illustrated by FIGS. 12 and 13 wherein it is seen that the general accumulation is substantially greater in quantity than the leaves defined in the low ridge, and can extend several feet in front of the rake and can be over a foot deep.

Figure 7:
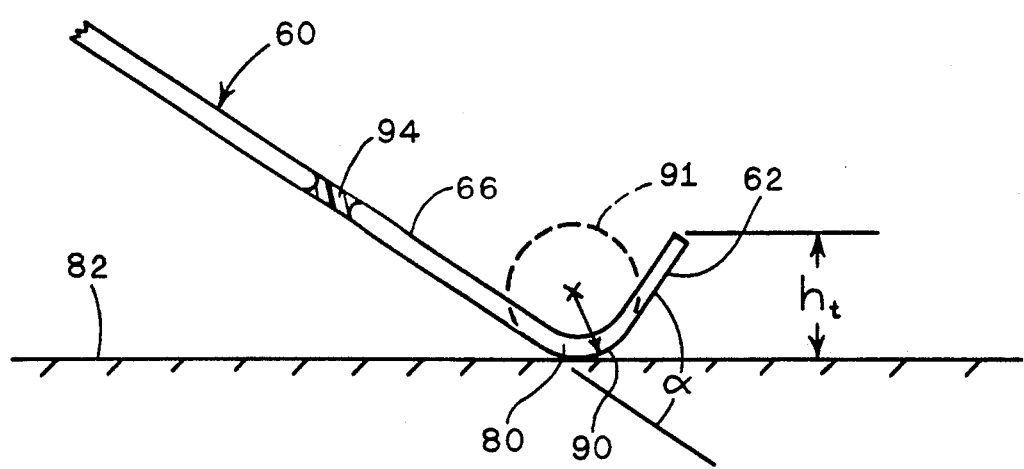
FIG. 7 shows a side view of the distal end of one of the rake teeth, including the upstanding end of the tooth and the curve of the curved bearing segment on the ground.

The height "$h_t$" of the upstanding end portions 62 of the teeth above the ground (as defined on a hard packed surface) can be the same as the height of teeth in a conventional lawn rake as taught in the prior art. Typically, the end portions 62 extend about 1 inch to about 2 inches, preferably about 1 inch to about 1½ inch, above the ground and form an angle alpha of between about 65 degrees and about 115 degrees with an extension of the main portions 66 of the corresponding teeth 60 as seen in FIG. 7. If the end portions extend much less than about 1 inch above the ground, the teeth tend to catch on e.g. uneven portions of the ground and entanglements of thatch and grass as the rake is pushed, whereby the work is stopped until the tooth is worked free. If the end portions extend more than about 2 inches above the ground, the rake tends to ride up and over the leaves rather than to slide under the leaves. The length of the teeth preferred for use in a given situation will depend to a degree on the character of the lawn. Generally longer teeth are preferred for use with rough ground surface and/or long grass; and shorter teeth are preferred with a smoother ground surface and short and thick grass. Such length of the teeth end portions is also conveniently adapted for use in pull raking.

If the angle alpha is much less than about 65 degrees, the end portions 62 tend to catch on uneven portions of the ground, or in the tangle of thatch or grass, stopping the work until the corresponding tooth is freed. Short and low angle end portions of the teeth can also tend to impale leaves thereon whereby the impaled leaves do not ride over the teeth, and can impede other leaves from doing so. If the angle alpha is much greater than about 115 degrees, then the teeth do not operate well in the pull raking mode of operation.

Figure 11:

Referring again to FIG. 4, the combination of rake platform 72, rear wall 74, and side walls 76 generally defines a receptacle 84 which is open on its front end (toward end portions 62 of the teeth 60) and open on top. Receptacle 84 generally receives the leaves as the rake is pushed and slides under them, and retains an accumulated mass 86 (FIGS. 6 and 10-13) of leaves which is immobilized with respect to the rake, by the retaining function of rear wall 74 and side walls 76; and generally within the receptacle defined by walls 74 and 76 and platform 72. The interlocking and entanglement of this immobile mass 86 of leaves with the leaves in front of it enables the pushing and build-up of leaves on the rake and in front of the rake as seen in FIGS. 11-13. As seen in FIGS. 12-13, leaves can ride up onto the immobile mass 86 retained by the receptacle and generally become a part of the immobile mass and are interlocked and entangled therewith, until such time as the height of the immobile mass 86 is a whole number multiple of the height "$h_w$" of the rear and side walls 74 and 76 respectively of receptacle 84. Accordingly, walls 74 and 76 can be substantially shorter than the depth of the accumulated pile of leaves which is to be built up. An exemplary, but not limiting, ratio between height "$h_w$" and the depth of the leaves which can readily be accumulated on the receptacle 84 is about ⅓, as seen in FIGS. 12-13. Accordingly, a receptacle 84 having wall heights "$h_2$" of about 3 inches will readily accumulate leaves thereon to a depth of about 8-11 inches. A minimum height "$h_w$" of about 1½ inches is required in order to effectively retain leaves while accumulating and pushing a pile of leaves ahead of the rake. In general, the height "$h_w$" is preferably at least as great as the height "$h_t$" of the ends of the teeth, whereby leaves which can ride up and over the ridge and the teeth will be stopped and retained by the height "$h_w$" of the receptacle walls, and especially the rear wall which extends in and presents a plane generally perpendicular to the direction of travel of the leaves. A height "$h_w$" of about 1½ to about 4 inches, preferably 2 to 3½ inches, is preferred. A height "$h_w$" of less than the recited range is somewhat ineffective in holding leaves while accumulating and pushing a pile of leaves ahead of the rake. Rather, when the walls are lower, the leaves tend to spill over the top of the receptacle walls and fall off the rear of the rake body. The receptacle becomes progressively less effective in holding leaves as the height of the walls 24, 26 is reduced.

A height greater than 4 inches is still effective for pushing, and is within the scope of the invention, but generally will not enable the pushing of any greater amount of leaves than walls of 3-4 inches height, while it does add weight to the rake. Heights "$h_w$" substantially greater than 4 inches for a hand rake tool are not preferred because they could interfere with conventional pull raking use as in FIG. 8, especially at low angles delta. Namely, excessively tall walls as shown in dashed outline at 88 in FIG. 8 would make it difficult to maintain a clearance between the side walls and the ground 82 as shown. Accordingly, the shorter walls are preferred.

The rake attachments and rake bodies used in this invention are conveniently made with the same materials, e.g. plastics, which are used to make conventional rake bodies, and can be readily made using the same types of processes.

The outer surfaces 90 of bearing segments 64 must traverse a sufficiently large curve that they will ride over the ground 82 as shown in FIGS. 6 and 7 rather than impact, or dig into the ground. The size of the curve can generally be defined by the general radius of the imaginary arc 91 which best defines the curve of the outer surface 90. The specific minimum radius of curvature of the arc required for use on a given ground surface will depend on a number of factors including unevenness in the ground 82, roughness of the bearing surface 90, stiffness of the tooth 60, grass height and thickness, and the like. For use on a typical grass lawn, the radius of curvature of the arc will generally be about 0.2 inch to about 0.7 inch, preferably about 0.3 inch to 0.6 inch. A radius of about 0.37 to about 0.5 inch works well on many surfaces, and can serve well on a general purpose rake which is to be used on a variety of ground surfaces. Below the recited range, the rake will be limited to use only on smooth hard surfaces. Above the recited range, there is an increasing tendency for the rake to ride up and over the leaves rather than to slide under the leaves. Also, the end portions 62 of the teeth may be less than ideally suited for pull raking use.

Except where specifically recited otherwise, "ground" and "ground surface" as used herein include the normal thatch and lawn vegetation which is supported above the soil surface. Accordingly, a rake placed on the "ground" may be supported by the soil, by thatch, or by vegetation such as grass.

Especially on a bow-type rake as illustrated, wherein the teeth 78 (FIG. 4) extend from a generally common (hypothetical) point of intersection 92 at the juncture of the rake body with the handle, the push raking function applies forces which tend to spread the teeth. Accordingly, the teeth are preferably joined together near end portions 80 by a continuous reinforcing strip 94 or other reinforcement means.

Stabilizing fingers 28 (FIG. 2) and the corresponding portion of platform 72 (FIG. 4) preferably extend forwardly on the assembly (FIG. 2) and rake (FIG. 4) to, or near, reinforcing strip 94. With respect to the rake attachment 10 of FIG. 1, the front 18 of the platform 12 generally about corresponds front-to-rear in the assembly (FIGS. 2-3) with the front 56 of the rake body platform 48. Accordingly, stabilizing fingers 28 generally extend from the front 18 of the attachment platform a distance "$D_F$" corresponding to about 0.3 to about 0.8, preferably about 0.4 to about 0.7, times the average length "$D_L$" between the front and the rear of the attachment platform.

The rakes and rake attachments of the invention are generally described herein with respect to raking leaves by push and pull operations. Other typical lawn debris such as pine cones, beds of needles, and the like can also be raked using the same general principles.

With respect to FIGS. 1-6, the rake body platform and the attachment platform both generally represent sheetlike configurations which are illustrated as planar. Either or both platforms can be contoured, curved, and the like. Such non-planar shapes will be compatible with especially the push raking operation when combined with or into the rear and side walls defined herein in formation of the receptacle 84. With respect to the embodiments of FIGS. 1-3, the non-planar shapes will be compatible with assembly of the attachment to the rake, and compatibility of the assembled combination with the push-raking operation.

While the rear wall and the side walls (e.g. 74 and 76) are illustrated and described as separate elements, it is clear that they are joined at the corners 96 whereby they form one generally continuous receptacle wall. Accordingly, the perimeter of the receptacle as defined by walls 74 and 76 can take on a variety of configurations so long as it operates to establish a mass 86 of immobile leaves or other debris during the push raking function. For example, walls 74, 76 could define a single generally circular surface rotated about a point on axis 98 between rear wall 74 and front 56 of the rake body platform. It is only critical that a rear wall push the leaves and that side walls or their equivalent, immobilize the leaves sideways, whereby the immobilized mass 86 is established and retained.

In preferred embodiments, side walls 26,76 define at least a portion of the configuration of the receptacle, preferably toward the fronts of the side walls, which approaches a parallel relationship with longitudinal axis 98 of the rake as illustrated in FIG. 4. This approximately parallel portion of the side walls laterally stabilizes the leaves which are retained therein and which form the immobile mass 86 on the receptacle, and helps to immobilize the leaves.

The width of the receptacle as defined by side walls 26 or 76 generally extends outwardly of a teeth angle defined between the outer-most teeth at the opposing sides of the rake, and point of intersection 92 or the like adjacent the handle. The extended width generally extends rearwardly from a point of intersection with the teeth angle, and generally starts along a line parallel with axis 98, or forms a small angle with the direction of extension of axis 98, and forms an outwardly disposed curve or corner as at 96 with the rear wall. The radius of curvature of e.g. corners 96 can be quite large; however it is preferred to maintain a rear wall that defines at least about 50% of the maximum width "W" of the receptacle wherein the height "$h_w$" of the sidewalls is at least about 1½ inches. It is most preferred that the rear wall define a substantial perpendicular with axis 98 for at least about 50% of the maximum width "W" of the receptacle.

In the typical push raking operation illustrated in FIGS. 6 and 9-13 the rake handle is generally held at a level generally between the person's hips and chest. A typical such height is between about 36 and about 54 inches above the ground. Accordingly, during such operation, the rake platform 72 generally defines an angle beta (FIG. 6) with the ground 82, of between about 25 degrees and about 45 degrees.

In the typical pull raking operation, the rake is held in the conventional and well known manner for pull raking, wherein the rake platform defines the somewhat larger angle delta (FIG. 8) with the ground 82, generally about 30 degrees to about 50 degrees.

The number of bearing surfaces 90 on bearing segments 80 which actually touch the ground will depend on the configuration of the front of the rake. As seen in FIGS. 2 and 4, e.g. the front of the illustrated rakes, as defined by the combined upstanding end portions 62 of the teeth, is curved about point 92, whereby generally only a few of the bearing surfaces 90 actually bear on the ground at any one time, as illustrated in FIG. 6. In other embodiments, not shown, where the front of the rake is defined in a straight line, all the bearing surfaces generally bear on the ground simultaneously.

The sliding of the rakes of this invention along the ground 82 on the bearing segments 80 in gathering lawn debris requires noticeably less energy and effort than the pull raking function wherein the ends of the teeth are generally pulled through the mat of grass, and some of the thatch, of the lawn. As illustrated in FIGS. 9-13, the push raking function can readily be performed by an adult single handedly.

In pushing the rakes of the invention as illustrated, the downward component of the pushing force urges the rake to somewhat deflect the flexible grasses; and the bearing segments 80 may pass below the top surface of the grass, whereby the effective height of projection of the up-turned end portions 62 of the teeth 60 or 78 will be less than height "$h_t$". Typically, leaves and other lawn debris is supported on the top surface of the lawn, defined by the tops of the grasses. So the effective height of ends 62 is that height which the leaves must rise above the top surface of the lawn in order to clear the tops of the up-turned end portions 62. Accordingly, as the bearing segments 80 are pushed below the top surface of the lawn, the tops of the end portions 62 are also lowered, whereby the effective height of the teeth between the up-turned end portions 62 and the top surface of the lawn is correspondingly less. Thus, the height by which the leaves rise to clear the upturned ends 62 will be correspondingly less than "$h_t$".

Accordingly, this invention provides a lawn rake which requires less energy and less dexterity to operate than a conventional rake.

The invention provides a lawn rake which can be used primarily in a push raking mode to gather the bulk of typical yard debris, and which is adapted to also be used in the conventional pull raking mode.

Specifically, the invention provides a push-pull rake having upstanding end portions of the rake teeth, and a receptacle, on the same side of the rake as the upstanding portions of the teeth; the receptacle being adapted for receiving leaves and for providing a pushing surface to, in cooperation with the accumulating lawn debris, push and pile the lawn debris ahead of the rake.

The invention further provides such a rake wherein the height of the receptacle walls is such that the rake can be used in the conventional pull raking mode, with the teeth directed downwardly, while maintaining clearance between the receptacle walls and the ground.

Still further, the invention provides, on the rake body, curved bearing segments of the teeth wherein the main portions of the teeth meet the upstanding end portions of the teeth. The radii of the arcs of the bearing surfaces are sufficiently large to accommodate sliding upon forward pushing of the rake body along the ground of an average lawn when the rear of the rake body is inclined upwardly as at a normal pushing height of an adult, e.g. between the hips and chest.

The invention also provides a rake attachment apparatus adapted to be attached to a lawn rake, thereby providing, on the rake, a receptacle for receiving leaves and for providing a pushing surface to push and pile lawn debris on and ahead of the rake.

The invention further embodies methods of raking wherein the rake is pushed in collecting and cleaning up lawn debris, with optional pull-raking as a further cleanup.

Accordingly, preferred embodiments of the invention have been illustrated and described. Those skilled in the art will now see that certain modifications can be made to the rake attachments and rakes herein disclosed with respect to the preferred embodiments without departing from the spirit of the instant invention, and while the invention has been described above with respect to its preferred embodiments, it will be understood that the invention is capable of numerous rearrangements, modifications and alterations, and all such arrangements, modifications and alterations are intended to be within the scope of the appended claims.

Having thus described the invention, what is claimed is:

1. A rake body, comprising:
   (a) a rake body platform, said rake body platform comprising a top surface, a bottom surface, a front, a rear, and opposing sides between said front and said rear;
   (b) an upstanding rear wall secured to said rake body platform and extending upwardly from said top surface of said rake body platform;
   (c) upstanding side walls secured to said rake body platform, said side walls extending upwardly from said top surface of said rake body platform and forwardly of said rear wall toward said front of said rake body platform; and
   (d) a plurality of upstanding teeth spaced along said front of said rake body platform and extending upwardly from said platform, said upstanding rear and side walls collectively comprising a receptacle having an open top and an open front, said rear wall and said side walls, collectively, having sufficient height that said rake body is effective, as said rake body is pushed along the ground surface with said rake body platform disposed at an angle of about 25 degrees to about 45 degrees with the ground, and with said front of said platform generally comprising the apex of said angle, said teeth extending upwardly from the ground, to collect and immobilize a mass of lawn debris thereon, and, upon further pushing of said rake body, to cause accumulation of additional lawn debris in front of said rake body as an extension of said immobilized mass of said lawn debris.

2. A rake body as in claim 1 wherein said upstanding teeth are joined with said rake body platform by corresponding curved bearing segments, said curved bearing segments being positioned for bearing contact with the ground during pushing use of said rake body, corresponding outer surfaces of said curved bearing segments comprising a radius of curvature sufficiently large to accommodate pushing said rake body along the ground and in contact therewith at said curved bearing segments when said rear of said rake body platform is held at a height corresponding to the height of said rear when a conventional handle attached thereto is held at normal pushing height of an adult.

3. A rake body as in claim 2 wherein said curved bearing segments traverse arcs having radius of curvature of about 0.2 inch to about 0.7 inch.

4. A rake body as in claim 1, the height and length of said sidewalls being such that said rake body platform can be turned over with said teeth pointing downwardly and can be used in conventional pull raking while maintaining clearance between said side walls and the ground.

5. A rake body as in claim 1 wherein said rear wall extends at least 1.5 inches above said rake body platform.

6. Rake attachment apparatus adapted to be attached to a lawn rake, said rake attachment apparatus comprising:
   (a) an attachment platform, said platform being generally defined in a sheet-like surface, and comprising a top surface, a bottom surface, a front, a rear, and opposing sides between said front and said rear;
   (b) an upstanding rear wall secured to said attachment platform, at said rear of said platform, and extending upwardly from said top surface of said platform;
   (c) upstanding side walls secured to said attachment platform, said side walls extending upwardly from said top surface of said attachment platform and forwardly of said rear wall toward said front of said attachment platform;
   (d) a pair of stabilizing fingers extending forwardly of said front of said attachment platform, with first elements of said stabilizing fingers being disposed generally parallel to imaginary extensions of said platform along the entire lengths of said stabilizing fingers; and
   (e) means for securing said rake attachment apparatus to a lawn rake.

7. Rake attachment apparatus as in claim 6, the height and length of said side walls being such that, when said attachment apparatus is secured to a lawn rake, said lawn rake comprising a rake body comprising a plurality of upstanding teeth spaced along a front thereof, and a rake handle extending from said rake body at a joinder thereof, said rear wall of said attachment apparatus being disposed adjacent said joinder of said rake body and said handle, the rake can be turned over with the teeth pointing downwardly and can be used in conventional pull raking while maintaining clearance between said side walls and the ground.

8. A rake comprising the rake attachment of claim 6 secured to a lawn rake, said lawn rake comprising a handle having a distal end, and a rake body secured thereto at a joinder thereof, said rake body comprising a rake body platform generally defined in a sheet-like surface, said rake body platform comprising a top surface thereof, a bottom surface, a front, and opposing side edges, and a plurality of upstanding teeth spaced along said front of said rake body platform, said top surface of said attachment apparatus platform of said attachment apparatus being disposed adjacent said bottom surface of said rake body platform, said rake body platform and said attachment apparatus platform comprising, in combination, a composite platform, said stabilizing fingers of said attachment apparatus being disposed along, and secured to, said side edges of said rake body platform.

9. A rake as in claim 8 wherein said upstanding teeth comprise outer surfaces thereof joined with said bottom surface of said rake body platform by curved bearing segments said curved bearing segments being positioned for bearing contact with the ground during pushing use of said rake body, said curved bearing segments comprising a radius of curvature sufficiently large to accommodate pushing said rake along the ground and in contact therewith at said curved bearing segments when said distal end of said rake handle is held at normal pushing height for an adult.

10. A rake as in claim 9, the height and length of said walls being such that said rake can be turned over with said teeth pointing downwardly, and can be used in conventional pull raking while maintaining clearance between said side walls and the ground.

11. A rake body as in claim 9 wherein said curved bearing segments traverse arcs having radius of curvature of about 0.2 inch to about 0.7 inch.

12. A rake as in claim 8, the height and length of said side walls being such that said rake can be turned over with said teeth pointing downwardly, and can be used in conventional pull raking while maintaining clearance between said side walls and the ground.

13. A rake body as in claim 8 wherein said rear wall extends at least 1.5 inches above said rake body platform.

14. A method of raking lawn debris, said method comprising the steps of:

(a) selecting a rake comprising
  (i) a rake body, said rake body comprising
    (1) a rake body platform, said rake body platform comprising a first surface defining a top surface thereof, a second bottom surface thereof, a front, a rear, and opposing sides between said front and said rear,
    (2) an upstanding rear wall secured to said rake body platform and extending upwardly from said top surface of said rake body platform,
    (3) upstanding side walls secured to said rake body platform, said side walls extending upwardly from said top surface of said rake body platform and forwardly of said rear wall toward said front of said rake body platform, and
    (4) a plurality of upstanding teeth spaced forwardly of said front of said rake body platform, said teeth having teeth ends extending upwardly from said first surface, said teeth comprising outer surfaces thereof joined with said bottom surface of said rake body platform by corresponding curved bearing segments,
  (ii) a rake handle secured to said rake body at a joinder thereof, said rake handle having a distal end thereof disposed away from said rake body, said upstanding rear and side walls collectively, of said rake body, comprising a receptacle having an open top and an open front, said rear wall and said side walls, collectively, having sufficient height that said rake body is effective, as said rake body is pushed along the ground surface with said rake body platform disposed at an angle of about 25 to about 45 degrees with the ground, and with a surface comprising said second surface generally comprising the apex of said angle, said teeth extending upwardly from the ground, to collect and immobilize a mass of lawn debris thereon, and, upon further pushing of said rake body, to cause accumulation of additional lawn debris in front of said rake body as an extension of said immobilized mass, (b) placing said curved bearing segments on the ground with said teeth extending upwardly in front of lawn debris;

(c) positioning said distal end of said handle at a height whereby said rake body platform defines an angle of about 25 to about 45 degrees with the ground;

(d) pushing said rake toward and into said debris with said teeth extending upwardly, whereby said debris rides over said upstanding teeth and into said receptacle, thereby establishing said immobilized mass of debris; and (e) pushing said rake further into said debris whereupon an additional quantity of said lawn debris accumulates in front of said rake as an extension of said immobilized mass.

15. A method as in claim 14 wherein said selecting step (a) includes selecting said rake such that the height and length of said sidewalls are such that said rake platform can be turned over with said teeth pointing downwardly and can be used in conventional pull raking without incurring interference between said side walls and round, and further including the step (e) turning said rake over with said teeth pointing downwardly and using said rake in conventional pull raking without incurring interference between said side walls and the ground.

16. A rake body, comprising:

(a) a rake body platform, said rake body platform comprising a sheet, said sheet having a top surface, a bottom surface, a front, a rear, and opposing sides between said front and said rear;

(b) an upstanding rear wall secured to said rake body platform and extending upwardly from said top surface of said rake body platform;

(c) upstanding side walls secured to said rake body platform, said side walls extending upwardly from said top surface of said rake body platform and forwardly of said rear wall toward said front of said rake body platform; and (d) a plurality of teeth having upstanding ends thereof, said plurality of teeth being spaced along said front of said rake body platform, said upstanding ends extending upwardly from said platform, outer-most ones of said teeth defining an angle therebetween, said upsatanding rear wall and said upstanding side walls collectively comprising a receptacle having an open top and an open front, said receptacle having a width generally extending outwardly of said outer-most teeth on opposing sides of said rake body.

* * * * *